United States Patent
Kalkanoglu et al.

(10) Patent No.: US 9,044,921 B2
(45) Date of Patent: *Jun. 2, 2015

(54) SOLAR HEAT REFLECTIVE ROOFING MEMBRANE AND PROCESS FOR MAKING THE SAME

(75) Inventors: Husnu M. Kalkanoglu, Swarthmore, PA (US); Ming Liang Shiao, Collegeville, PA (US); Gregory F. Jacobs, Oreland, PA (US)

(73) Assignee: CertainTeed Corporation, Valley Forge, PA (US)

( * ) Notice: Subject to any disclaimer, the term of this patent is extended or adjusted under 35 U.S.C. 154(b) by 1528 days.

This patent is subject to a terminal disclaimer.

(21) Appl. No.: 11/380,322

(22) Filed: Apr. 26, 2006

(65) Prior Publication Data

US 2007/0054129 A1 Mar. 8, 2007

Related U.S. Application Data

(63) Continuation-in-part of application No. 11/162,346, filed on Sep. 7, 2005, now Pat. No. 7,422,989.

(51) Int. Cl.
*B32B 11/00* (2006.01)
*B32B 27/00* (2006.01)
(Continued)

(52) U.S. Cl.
CPC ............... *B32B 27/00* (2013.01); *B32B 5/022* (2013.01); *B32B 11/10* (2013.01); *B32B 25/10* (2013.01);
(Continued)

(58) Field of Classification Search
CPC ............ E04D 7/00; E04D 11/02; E04D 11/00; E04D 5/00; E04D 5/10; E04D 5/12; E04D 12/002; C08L 95/005; C09D 5/004; C08K 3/38; C08K 3/18; C08K 3/26; C08K 3/00; D04H 3/007; D04H 3/011; D04H 3/14; D04H 3/16; D04H 3/153; D04H 1/46; D06N 5/00; D06N 7/00; B32B 5/18; B32B 27/36; B32B 11/00; B32B 33/00; B32B 9/00; B32B 18/00; B32B 27/00; B32B 31/00; B32B 25/00; B32B 25/04; B32B 27/30; B32B 17/12; B32B 5/26; B32B 37/00; B32B 27/38; B32B 27/34; B32B 5/022; B32B 25/10; B32B 25/20; B32B 27/12; B32B 27/304; B32B 27/308; B32B 11/10; B32B 2419/06; B32B 2255/02; B32B 2255/26; B32B 2260/021; B32B 2260/046; B32B 2262/02; B32B 2262/101; B32B 2264/102; B32B 2307/304; B32B 2307/416; B32B 2307/552; B32B 2307/554; B32B 2307/712; B32R 11/10
USPC ........... 442/131, 327, 394, 74, 132, 164, 180, 442/417, 402, 26, 27, 35, 396, 45, 69, 85; 428/193, 213, 40.1, 141, 198, 343, 428/284, 317.3, 292.1, 903, 355, 297.4, 428/283, 206, 156, 170, 171, 219, 224, 280, 428/289, 291, 288, 296, 40.3, 41.5, 41.6, 428/41.7, 41.8, 143, 317.1, 319.7, 150, 428/42.1, 323, 317.5, 147, 144, 403, 440, 428/332; 156/71, 157, 166, 176, 60; 52/302.4, 420, 425, 553, 745.06; 524/59, 405, 425, 430, 495, 60; 516/38, 43, 45, 77, 79, 87; 106/280, 106/282, 283, 287.27, 287.3, 287.32, 106/287.35, 18.26, 163.01
See application file for complete search history.

(56) References Cited

U.S. PATENT DOCUMENTS 2,379,358 A 6/1945 Jewett
2,417,058 A 3/1947 Buzzell et al.
(Continued)

OTHER PUBLICATIONS

Screen Technology Group, Inc. Screening and Sizing with Wire Cloth—Sieve Comparison Table. http://www.wovenwire.com/reference/sievescreen.htm.*
(Continued)

*Primary Examiner* — Jennifer Chriss
*Assistant Examiner* — Altrev Sykes
(74) *Attorney, Agent, or Firm* — Paul & Paul

(57) ABSTRACT

A roofing membrane with high solar heat reflectance includes a bituminous base sheet, a tie-layer with a reinforcement material, and a solar heat-reflective upper layer.

24 Claims, 2 Drawing Sheets

(51) Int. Cl.
| | |
|---|---|
| *D04H 3/007* | (2012.01) |
| *E04D 11/02* | (2006.01) |
| *C08K 3/00* | (2006.01) |
| *E04D 5/10* | (2006.01) |
| *B32B 5/02* | (2006.01) |
| *B32B 11/10* | (2006.01) |
| *B32B 25/10* | (2006.01) |
| *B32B 25/20* | (2006.01) |
| *B32B 27/12* | (2006.01) |
| *B32B 27/30* | (2006.01) |

(52) U.S. Cl.
CPC .............. B32B 25/20 (2013.01); B32B 27/12 (2013.01); B32B 27/304 (2013.01); B32B 27/308 (2013.01); *B32B 2255/02* (2013.01); *B32B 2255/26* (2013.01); *B32B 2260/021* (2013.01); *B32B 2260/046* (2013.01); *B32B 2262/02* (2013.01); *B32B 2262/101* (2013.01); *B32B 2264/102* (2013.01); *B32B 2307/304* (2013.01); *B32B 2307/416* (2013.01); *B32B 2307/552* (2013.01); *B32B 2307/554* (2013.01); *B32B 2307/712* (2013.01); *B32B 2419/06* (2013.01)

(56) References Cited

U.S. PATENT DOCUMENTS

| | | | |
|---|---|---|---|
| 2,591,149 A | 4/1952 | Grove | |
| 2,614,051 A | 10/1952 | Buzzell et al. | |
| 2,695,851 A | 11/1954 | Lodge | |
| 2,732,311 A | 1/1956 | Hartwright | |
| 2,898,232 A | 8/1959 | Miller et al. | |
| 2,927,045 A | 3/1960 | Lodge et al. | |
| 2,963,378 A | 12/1960 | Plamquist et al. | |
| 2,981,636 A | 4/1961 | Lodge et al. | |
| 2,986,476 A | 5/1961 | Larrsen | |
| 3,053,716 A * | 9/1962 | Finan | 428/198 |
| 3,225,031 A | 12/1965 | Sherlock | |
| 3,507,676 A | 4/1970 | McMahon | |
| 3,689,298 A * | 9/1972 | Dybalski et al. | 106/280 |
| 4,038,239 A | 7/1977 | Coyner et al. | |
| 4,092,441 A | 5/1978 | Meyer et al. | |
| 4,218,502 A | 8/1980 | Graham et al. | |
| 4,287,248 A | 9/1981 | Gessner et al. | |
| 4,378,408 A | 3/1983 | Joedicke | |
| 4,583,486 A | 4/1986 | Miller | |
| 4,717,614 A | 1/1988 | Bondoc et al. | |
| 5,000,999 A | 3/1991 | Hollander | |
| 5,194,113 A | 3/1993 | Lasch et al. | |
| 5,240,760 A | 8/1993 | George et al. | |
| 5,310,803 A | 5/1994 | Hansen | |
| 5,380,552 A | 1/1995 | George et al. | |
| 5,411,803 A | 5/1995 | George et al. | |
| 5,427,793 A | 6/1995 | Bigham et al. | |
| 5,456,785 A | 10/1995 | Venable | |
| 5,484,477 A | 1/1996 | George et al. | |
| 5,516,573 A | 5/1996 | George et al. | |
| 5,571,596 A | 11/1996 | Johnson | |
| 5,573,782 A | 11/1996 | Bigham et al. | |
| 5,595,813 A | 1/1997 | Ogawa et al. | |
| 5,620,554 A | 4/1997 | Venable | |
| 5,643,399 A | 7/1997 | Venable | |
| 5,660,915 A * | 8/1997 | Schoeps et al. | 428/141 |
| 5,723,516 A | 3/1998 | Bigham et al. | |
| 5,731,369 A | 3/1998 | Mahoney | |
| 5,795,389 A | 8/1998 | Koschitzky | |
| 5,928,761 A | 7/1999 | Hedblom et al. | |
| 5,962,143 A | 10/1999 | Krauthauser et al. | |
| 6,143,318 A | 11/2000 | Gilchrist et al. | |
| 6,174,360 B1 | 1/2001 | Sliwinski et al. | |
| 6,214,466 B1 | 4/2001 | Joedicke | |
| 6,217,252 B1 | 4/2001 | Tolliver et al. | |
| 6,245,381 B1 | 6/2001 | Israel | |
| 6,245,850 B1 | 6/2001 | Fields | |
| 6,296,912 B1 | 10/2001 | Zickell | |
| 6,355,309 B1 | 3/2002 | Fleming et al. | |
| 6,376,075 B1 | 4/2002 | Tacke-Willemsen et al. | |
| 6,426,309 B1 | 7/2002 | Miller et al. | |
| 6,451,874 B1 | 9/2002 | Purgett et al. | |
| 6,502,360 B2 | 1/2003 | Carr, III et al. | |
| 6,521,038 B2 | 2/2003 | Yanagimoto et al. | |
| 6,531,200 B2 | 3/2003 | Zickell et al. | |
| 6,548,145 B2 | 4/2003 | Joedicke | |
| 6,569,520 B1 | 5/2003 | Jacobs | |
| 6,607,781 B2 | 8/2003 | Joedicke | |
| 6,610,147 B2 | 8/2003 | Aschenbeck | |
| 6,692,824 B2 | 2/2004 | Benz et al. | |
| 6,933,007 B2 | 8/2005 | Fensel et al. | |
| 7,060,658 B2 | 6/2006 | Joedicke | |
| 7,070,843 B2 | 7/2006 | Bartek et al. | |
| 7,070,844 B2 | 7/2006 | Bartek | |
| 7,132,143 B2 | 11/2006 | Zanchetta et al. | |
| 7,238,408 B2 | 7/2007 | Aschenbeck et al. | |
| 7,241,500 B2 | 7/2007 | Shiao et al. | |
| 7,452,598 B2 | 11/2008 | Shiao et al. | |
| 7,618,700 B2 | 11/2009 | Furst | |
| 2002/0092596 A1 | 7/2002 | Phillips et al. | |
| 2002/0160151 A1 | 10/2002 | Pinault et al. | |
| 2003/0044525 A1 | 3/2003 | Aschenbeck | |
| 2003/0068469 A1 | 4/2003 | Aschenbeck et al. | |
| 2003/0091795 A1 | 5/2003 | Kiik et al. | |
| 2003/0091814 A1 | 5/2003 | Benz et al. | |
| 2003/0152747 A1 | 8/2003 | Fensel et al. | |
| 2003/0203145 A1 | 10/2003 | Zanchetta et al. | |
| 2003/0219563 A1 | 11/2003 | Zanchetta et al. | |
| 2004/0109983 A1 * | 6/2004 | Rotter et al. | 428/143 |
| 2004/0109985 A1 * | 6/2004 | Furst | 428/156 |
| 2004/0255548 A1 | 12/2004 | Hong et al. | |
| 2004/0258835 A1 | 12/2004 | Hong et al. | |
| 2005/0053745 A1 | 3/2005 | Bartek et al. | |
| 2005/0053746 A1 * | 3/2005 | Bartek | 428/40.1 |
| 2005/0064175 A1 | 3/2005 | Azari et al. | |
| 2005/0072110 A1 | 4/2005 | Shiao et al. | |
| 2005/0072114 A1 | 4/2005 | Shiao et al. | |
| 2006/0110996 A1 | 5/2006 | Getlichermann | |
| 2006/0243388 A1 | 11/2006 | Kubiak et al. | |
| 2006/0251807 A1 | 11/2006 | Hong et al. | |
| 2007/0065640 A1 | 3/2007 | Joedicke | |
| 2007/0065641 A1 | 3/2007 | Joedicke | |
| 2008/0008868 A1 | 1/2008 | Hong et al. | |

OTHER PUBLICATIONS

U.S. Appl. No. 11/469,655, filed Sep. 1, 2006, Kalkanoglu et al.

* cited by examiner

SOLAR HEAT REFLECTIVE ROOFING MEMBRANE AND PROCESS FOR MAKING THE SAME

CROSS-REFERENCE TO RELATED APPLICATION

This is a continuation-in-part of U.S. patent application Ser. No. 11/162,346 filed Sep. 7, 2005.

BACKGROUND OF THE INVENTION

1. Field of the Invention

The present invention relates to bituminous roofing products such as asphalt-based roofing membranes and processes for making such roofing products.

2. Brief Description of the Prior Art

Asphalt-based roofing membranes are excellent waterproofing materials that have been extensively used in low-slope roofing systems to provide long-lasting and satisfactory roof coverings. Low-slope roofing systems are extensively used for commercial and industrial buildings. Examples of low-slope roofing systems are built-up roofs (BUR), modified bitumen roofs, and single-ply or membrane roofing systems. Asphalt-based roofing membranes are frequently used as waterproofing underlayment in low-rise roofing systems, as well as the uppermost or finish layer in built-up-roofs. Built-up roofs are sometimes covered with a layer of gravel or granular mineral material to protect the roofing membrane against mechanical damage.

Mineral-surfaced asphalt shingles, such as those described in ASTM D225 or D3462, are generally used for steep-sloped roofs to provide water-shedding function while adding aesthetically pleasing appearance to the roofs. Conversely, roll goods such as asphalt-based roofing membranes are generally used for low-slope roofs. Pigment-coated mineral particles are commonly used as color granules in roofing applications to provide aesthetic as well as protective functions. Roofing granules are generally used in asphalt shingles or in roofing membranes to protect asphalt from harmful ultraviolet radiation.

Roofing products such as asphalt shingles and roll stock are typically composite articles including a non-woven glass fiber or felt web covered with a coating of water repellent bituminous material, and optionally surfaced with protective mineral-based roofing granules. The bituminous material is characteristically black in color, and is strongly absorptive of incident solar radiation. Thus, asphalt-based roofing membranes can absorb significant amounts of solar radiation, which can result in elevated roof temperatures. This can contribute to the increase of energy usage for indoor air-conditioning, especially in a hot climate.

Asphalt shingles are generally constructed from asphalt-saturated roofing felts and surfaced by pigmented color granules. Asphalt-based roofing membranes are similarly constructed; except that roofing granules are not frequently employed. However, both asphalt shingles and asphalt-based roofing membranes are known to have low solar reflectivity and hence will absorb solar heat especially through the near infrared range of the solar spectrum.

This phenomenon increases as the surface becomes dark in color. For example, white-colored asphalt shingles with CIE L* greater than 60 can have solar reflectance greater than 25% (ASTM E1918 method), whereas non-white asphalt shingles with L* less than 60 can have solar reflectance in the range of 5-20%. As a result, it is common to measure temperatures as high as 71-77 degrees C. (160-170 degrees F.) on the surface of dark roofing shingles on a sunny day with 27 degree C. (80 degrees F.) ambient temperature.

Reduced energy consumption is an important national goal. For example, the State of California has a code requirement that all commercial roofing materials in low-slope applications need to exceed a minimum of 70% solar reflectance in order to meet California's energy budget code. Also, in order to qualify as Energy Star® roofing material, a roofing membrane needs to exceed 65% solar reflectance.

Typically, even a white mineral-surfaced, asphalt-based roofing membrane has only 30-35% solar reflectance.

In order to address this problem, externally applied coatings have sometimes been applied directly onto the shingle or membrane surface on the roof. White pigment-containing latex coatings have been proposed. Similarly, aluminum-coated asphalt roofing membranes have been employed to achieve solar heat reflectivity. U.S. Pat. No. 6,245,850 discloses a reflective asphalt emulsion for producing a reflective asphalt roofing membrane.

The use of exterior-grade coatings colored by infrared-reflective pigments has also been proposed for spraying onto the roof in the field. U.S. Patent Application Publication No. 2003/0068469A1 discloses an asphalt-based roofing material comprising a mat saturated with asphalt coating and a top coating having a top surface layer that has a solar reflectance of at least 70%.

U.S. Patent Application Publication No. 2002/0160151A1 discloses an integrated granule product comprising a film having a plurality of ceramic-coated granules bonded to the film by a cured adhesive and the cured adhesive or the film can have pigments. Such integrated granule product can be directly bonded to an asphalt-based substrate as roofing products.

In order to increase solar reflectance of built-up roofs, reflective coatings have been applied directly onto the surface of the roofing membrane. For example, white pigment containing latex coatings have been proposed and evaluated by various manufacturers. In addition, white single-ply roofing membranes formed from thermoplastic elastomers, PVC, or EPDM, etc., have been developed to achieve the required solar reflectance. Performance Roof Systems (Kansas City, Mo.) has also developed an asphalt-based roofing membrane having a white acrylic pre-impregnated mat on the top surface.

Laminated single-ply roofing membranes are known, such as those disclosed in U.S. Pat. Nos. 6,502,360; 5,456,785; 5,620,554; and 5,643,399. U.S. Pat. No. 6,296,912 discloses a roofing membrane having a fibrous layer on top for providing a secure surface for roof installation personnel.

There is a continuing need for roofing materials that have improved resistance to thermal stresses while providing an attractive appearance. Further, there is a continuing need to develop asphalt-based roofing membranes with solar reflectance greater than 70%.

SUMMARY OF THE INVENTION

The present invention provides a roofing membrane with high solar heat-reflectance. The roofing membrane comprises a bituminous base sheet; a tie-layer comprising a reinforcement material; and a solar heat-reflective upper layer. The solar heat-reflective upper layer preferably includes a first polymeric coating comprising at least one first polymeric binder and at least one first solar heat-reflective pigment.

The first polymeric coating has a first polymeric binder that is preferably selected from the group consisting of acrylic copolymers, polyesters, polyamides, epoxies, nonacid-containing polyolefins, polyolefin alloys, polypropylene, acid-containing polyolefins, fluoropolymers, polyvinyl chloride, polyester block amide, ethylene-chlorotrifluorethylene, and polyvinylidene fluoride. In a presently preferred embodiment, the polymeric binder is an acrylic copolymer. Preferably, the at least one first solar heat reflective pigment is titanium dioxide.

The solar heat-reflective upper layer can include both an inner sub-layer and an outer sub-layer. The inner sub-layer is preferably comprised of a second polymeric coating adapted to interpenetrate the tie-layer and at least one second solar heat-reflective pigment.

Preferably, the reinforcement material comprises a non-woven web of fibers. Preferably, the nonwoven web comprises fibers selected from the group of glass fibers, polymeric fibers and combinations thereof.

The second polymeric coating can comprise a second polymeric binder is also preferably selected from the group consisting of acrylic copolymers, polyesters, polyamides, epoxies, nonacid-containing polyolefins, polyolefin alloys, polypropylene, acid-containing polyolefins, polyvinyl chloride, fluoropolymers, polyester block amide, ethylene-chlorotrifluoroethylene, and polyvinylidene fluoride. In a presently preferred embodiment, the polymeric binder is also an acrylic copolymer. Preferably, the at least one second solar heat reflective pigment is also titanium dioxide.

In one presently preferred embodiment of the present invention, the outer sub-layer comprises a durable material. In this case, the outer sub-layer comprises a material selected from polyvinylidene fluoride, UV-curable coating compositions, acrylic based coating compositions, and silicone emulsions.

In one presently preferred embodiment of the present invention, the roofing membrane is formed from a bituminous base sheet and an intermediate web including tie-layer and the solar heat-reflective layer. Preferably, the intermediate web is formed by coating the tie-layer with a solar heat-reflective coating material.

The present invention also provides a process for preparing a roofing membrane with high solar heat reflectance. In one presently preferred embodiment, the preparative process of the present invention comprises laminating a tie-layer to a bituminous base sheet to form an intermediate sheet; depositing a polymeric coating composition on the intermediate sheet; and curing or solidifying the coating composition. Preferably, the polymeric coating composition is deposited by curtain coating. Preferably, the tie-layer is laminated to the bituminous base sheet by heating the surface of the base sheet to above the softening temperature of the bituminous material, and adhering the tie-layer to the base sheet by contacting the base sheet with the tie-layer and permitting the bituminous material to partially saturate the tie-layer. Preferably, the preparative process further comprises applying pressure while fusing the polymeric coating composition when a powder coating composition is employed as the polymeric coating composition.

In another presently preferred embodiment, the present invention provides a process for preparing a roofing membrane with high solar heat-reflectance, the process comprising laminating a tie-layer to a bituminous base sheet to form an intermediate sheet, depositing a solar heat-reflective polymeric coating composition on the intermediate sheet; and curing the solar heat-reflective polymeric coating composition to form a solar heat-reflective coating. In this embodiment, the solar heat-reflective coating is preferably deposited by curtain coating. In this embodiment, the process further comprises depositing a top or upper coating composition on the solar heat-reflective coating to form a top coating layer. Preferably, the top coating composition is deposited by curtain coating.

Preferably, in this embodiment the tie-layer is laminated to the bituminous base sheet by heating the surface of the base sheet to above the softening temperature of the bituminous material, and the tie-layer is adhered to the base sheet by contacting the base sheet with the tie-layer and permitting the bituminous material to partially saturate the tie-layer.

In a third presently preferred embodiment, the present invention provides a process for preparing a roofing membrane with high solar heat-reflectance in which the process comprises depositing a solar heat-reflective polymeric coating composition on a tie-layer to form an intermediate sheet; preferably by curtain coating, curing the solar heat-reflective coating composition to form a solar heat-reflective polymeric coating on top of the tie-layer; and laminating the tie-layer of the intermediate sheet to a bituminous base sheet. Optionally, this process further comprises depositing a top coating composition on the solar heat-reflective polymeric coating to form a top or upper coating layer. In this embodiment, the tie-layer is also laminated to the bituminous base sheet by heating the surface of the base sheet to above the softening temperature of the bituminous material, and adhering the tie-layer to the base sheet by contacting the base sheet with the tie-layer and permitting the bituminous material to partially saturate the tie-layer. However, in this embodiment, tie-layer forms the lower sub-layer of the intermediate sheet.

In another presently preferred embodiment, the heat reflective polymeric coating composition is deposited on the tie layer by extrusion coating.

In yet another embodiment, the heat reflective polymeric coating composition is deposited on the tie layer by lamination of a preformed film to the tie layer.

The present invention further provides a roof having high solar heat resistance. The roof comprises a roofing deck and a roofing membrane with high solar heat resistance according to the present invention adhered to the roofing deck. In addition, the present invention provides a method of constructing a roof having high solar heat resistance. The construction method comprises adhering a roofing membrane with high solar heat resistance according to the present invention to a roofing deck.

DETAILED DESCRIPTION OF THE PREFERRED EMBODIMENTS

In the process of the present invention, roofing membranes with high solar heat reflectance are formed by combining a reinforcement material as a tie-layer between the substrate of suitable bituminous membrane and a solar heat-reflective upper layer. The heat-reflective upper layer can be formed by applying a suitable polymeric coating composition on top of the tie-layer, by a suitable technique, such as by a curtain coating technique, or a spray technique such as by an electrostatic spray technique. Alternatively, the heat reflective upper lay can be formed by melting or fusing a suitable powder coating material in place during manufacturing.

Figure 1:
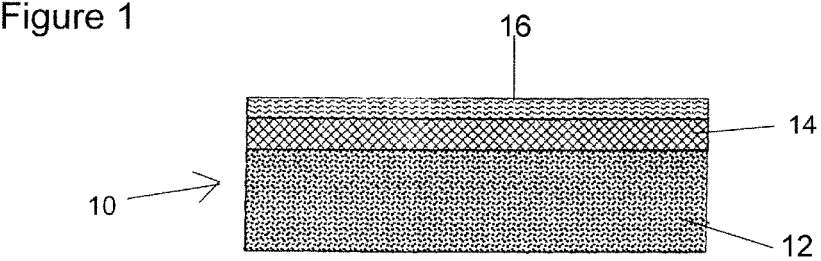
FIG. 1 is a schematic illustration of the structure of solar heat-reflective roofing membrane according to a first embodiment of the present invention.

Referring now to the figures in which like reference numerals represent like elements in each of the several views, there is shown in FIG. 1 a schematic illustration of a first embodiment of a solar heat-reflective roofing membrane 10 according to the present invention. The solar heat-reflective roofing membrane 10 is comprised of three layers 12, 14, 16. The first layer 12 is a bituminous membrane, such as an asphalt-based roofing base sheet, preferably with a self-adhering backing. Adhered to the upper surface of the base sheet 12 is a tie-layer 14 formed from a reinforcement material such as mineral particles. A solar heat-reflective coating 16, preferably formed from a polymeric coating composition, is provided on the tie-layer 14, to form an upper surface layer. Liquid applied polymeric coating compositions including a carrier such as aqueous dispersions and solutions or dispersions in organic solvents or plasticizers can be used. Alternatively, the polymer coating composition can take the form of a polymer melt. In addition, polymeric powder coating compositions can also be employed.

Figure 2:
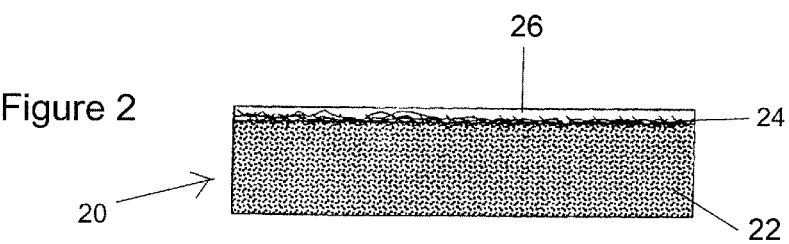
FIG. 2 is a schematic illustration of the structure of solar heat-reflective roofing membrane according to a second embodiment of the present invention.

A schematic illustration of a second embodiment of a solar heat-reflective roofing membrane 20 according to the present invention is shown in FIG. 2. The solar heat-reflective roofing membrane 20 is also comprised of three layers 22, 24, 26. The first layer 22 is also bituminous membrane, such as an asphalt-based roofing base sheet, preferably with a self-adhering backing. However, adhered to the upper surface of the base sheet 22 is a tie-layer 24 comprising a fibrous mat, such as a non-woven glass fiber mat. A solar heat-reflective coating 26 is also provided on the tie-layer 24, to form an upper surface layer.

The solar heat-reflective roofing products of the present invention, such as solar-reflective roofing membranes, can be manufactured using conventional roofing production processes, with the addition of one or more curtain coating steps, one or more extrusion coating steps, one or more spray coating steps, and/or one or more powder coating process steps in the case of some embodiments. Typically, bituminous roofing products are sheet goods that include a non-woven base or scrim formed of a fibrous material, such as a glass fiber scrim. The base is coated with one or more layers of a bituminous material such as asphalt to provide water and weather resistance to the roofing product. A self-adhering backing can also be applied to the lower or rear surface of the base, and covered with a suitable release sheet. The upper surface of the base layer is covered with a tie-layer, and in some embodiments of the present invention a liquid applied coating may be applied to the exposed surface of the tie layer, by a technique such as curtain coating or electrostatic spray coating. In some other embodiments of the present invention, a powder coating, an extrusion coating, a spray coating or a roll coating is then applied to the exposed surface of the tie-layer.

The solar heat-reflective roofing membrane is subsequently employed in constructing a solar heat-reflective roof according to the present invention. The roof is constructed by applying a solar-reflective roofing membrane according to the present invention to a suitable subroof in the case of new construction, or a suitably prepared roofing surface in the case of an existing structure. In constructing the roof, the upper surface of the solar-reflective roofing membrane can be covered with mineral granules to provide durability, reflect heat and solar radiation, and to protect the polymeric coating binder from environmental degradation. Optionally, a further protective coating (not shown) could be applied over the solar heat-reflective coating 26.

Figure 3:
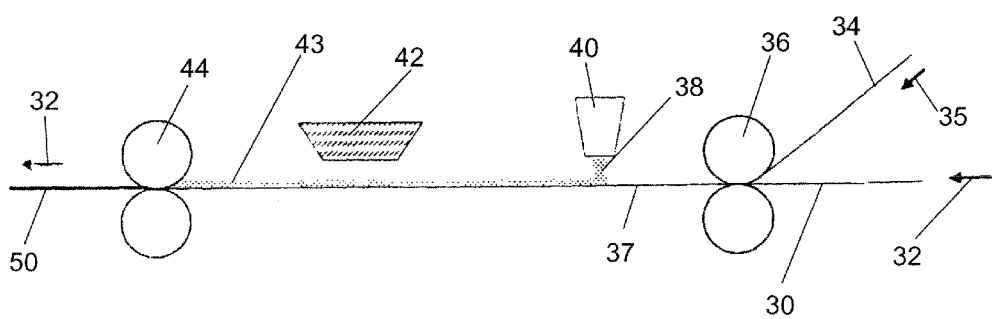
FIG. 3 is a schematic illustration of a first embodiment of a process according to the present invention for preparing a roofing membrane with high solar heat-reflectance.

FIG. 3 schematically illustrates a first presently preferred process according to the present invention for preparing a roofing membrane 50 with high solar heat-reflectance. A continuous web of bituminous membrane 30, such as an asphalt-based roofing base sheet with a self-adhering backing, is provided from a roll (not shown) as the base layer of the roofing membrane 50. The web of bituminous membrane 30 is fed to the processing apparatus in the direction shown by the arrows 32. A tie-layer web 34, such as a non-woven web of glass fiber, is fed to the processing apparatus in the direction shown by the arrow 35. The tie-layer web 34 is adhered to the upper surface of the base layer 30 by pressure applied by a first set of heated pressure rollers 36 to form an intermediate web 37. Next, a liquid solar heat-reflective coating composition 38 is deposited from a curtain coating apparatus 40 on the upper surface of the intermediate web 37 by a coating technique. Alternatively, other methods of applying the coating composition 38 to the intermediate web 37 such as electrostatic spray coating, or extrusion coating, depending upon the physical characteristics of the coating composition, can be employed (not shown). For example, the solar heat-reflective coating 38 could be in the form of a powder, and could be applied by conventional powder coating techniques. As the intermediate web 37 next passes under an infrared heater 42, the liquid coating composition 38 is dried to form a continuous coating 43 on the top of the intermediate web 37. In the case where an extrusion coating process is employed using a thermoplastic polymer, heater 42 may be optional, and a cooling means may be employed to bring the surface of the molten thermoplastic polymer to a substantially solid state. Optionally, the intermediate web 37 then passes through a second set of heated pressure rollers 44 which press the coating composition 43 into the tie-layer 34 and base layer 30 and provide a uniform, predetermined thickness to the roofing membrane 50, and the roofing membrane is taken up on a receiving roll (not shown).

Figure 4:
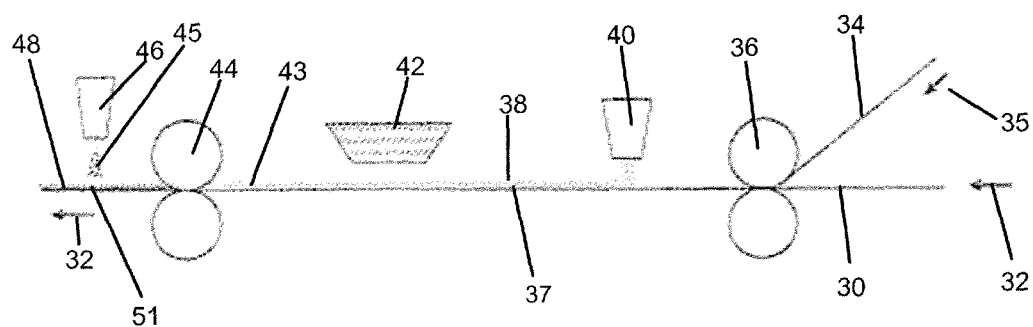
FIG. 4 is a schematic illustration of a second embodiment of a process according to the present invention for preparing a roofing membrane with high solar heat-reflectance.

FIG. 4 schematically illustrates a second presently preferred process according to the present invention for preparing a roofing membrane 51 with high solar heat-reflectance. In this process, the first presently preferred process is repeated, except that after the intermediate web 37 emerges from the second set of pressure rollers 44, a top coating composition 45 is dispensed from a second applicator 46, such as a curtain coating apparatus, onto the upper surface of the coating composition 43 to form a top coating layer 48. The top coating composition 46 is preferably cured or otherwise solidified to form a continuous top coating layer 48, for example by application of heat by a second infrared heater (not shown), and optionally, the resulting roofing membrane can be passed through a second set of pressure rollers or calendar rollers (not shown) to provide a uniform thickness to the roofing membrane 51.

Figure 5:
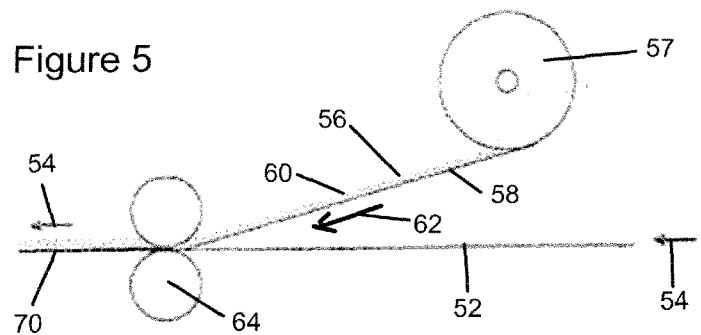
FIG. 5 is a schematic illustration of a third embodiment of a process according to the present invention for preparing a roofing membrane with high solar heat-reflectance.

FIG. 5 schematically illustrates a third presently preferred process according to the present invention for preparing a roofing membrane 70 with high solar heat-reflectance. A continuous web of bituminous membrane 52, such as an asphalt-based roofing base sheet with a self-adhering backing, is provided as the base layer of the roofing membrane 70. The web of bituminous membrane 52 is fed to the processing apparatus in the direction shown by the arrows 54. An intermediate web 56 comprising an inner sub-layer 58 and an outer sub-layer 60 is fed from a roll 57 to the processing apparatus in the direction shown by the arrow 62. The intermediate web 56 comprises a tie-layer pre-coated with a solar heat-reflective coating composition. Thus, the inner sub-layer 58 of the intermediate web 56 is formed as a tie-layer and the outer sub-layer 60 comprises a solar heat-reflective coating. The intermediate web 56 is adhered to the upper surface of the base layer 52 by pressure applied by a set of pressure rollers or calendar rollers 64 to form the roofing membrane 70.

Bituminous roofing products, such as the base sheet 30 or 52, are typically manufactured in continuous processes in which a continuous substrate sheet of a fibrous material, such as a continuous felt sheet or glass fiber mat, is immersed in a bath of hot, fluid bituminous coating material so that the bituminous material saturates the substrate sheet and coats at least one side of the substrate. The reverse side of the substrate sheet can be coated with an anti-stick material such as a suitable mineral powder or fine sand. Alternatively, the reverse side of the substrate sheet can be coated with an adhesive material, such as a layer of a suitable bituminous material or a pressure sensitive adhesive, to render the sheet self-adhering. In this case the adhesive layer is preferably covered with a suitable release sheet.

In one presently preferred embodiment roofing membrane according to the present invention is prepared in a batch process, in which rolls of bituminous base sheet are fed through a curtain coater to apply the tie-layer and/or the solar heat-reflective upper layer to the bituminous base sheet.

The solar-reflective roofing membrane can be formed into roll goods for commercial or industrial roofing applications. Alternatively, the solar-reflective roofing membrane can be cut into conventional shingle sizes and shapes (such as one foot by three feet rectangles), slots can be cut in the shingles to provide a plurality of "tabs" for ease of installation or for aesthetic effects, additional bituminous adhesive can be applied in strategic locations and covered with release paper to provide for securing successive courses of shingles during roof installation, and the finished shingles can be packaged.

The bituminous material used in manufacturing roofing products according to the present invention is derived from a petroleum processing by-product such as pitch, "straight-run" bitumen, or "blown" bitumen. The bituminous material can be modified with extender materials such as oils, petroleum extracts, and/or petroleum residues. The bituminous material can include various modifying ingredients including polymeric materials such as, for example, SBS (styrene-butadiene-styrene) block copolymers, resins, flame-retardant materials, oils, stabilizing materials, anti-static compounds, and the like. Preferably, the total amount by weight of such modifying ingredients is not more than about 15 percent of the total weight of the bituminous material. The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130 degrees C. to about 160 degrees C. The bituminous composition can also include a suitable filler, such as calcium carbonate, talc, carbon black, stone dust, or fly ash, preferably in an amount from about 10 percent to 70 percent by weight of the bituminous composite material.

Examples of suitable bituminous membranes for use as base sheets in the process of the present invention include asphalt roofing membranes such as asphalt-based, self-adhering roofing base sheet available from CertainTeed Corporation, Valley Forge, Pa., for example, WinterGuard™ shingle underlayment, a base sheet which is impregnated with rubberized asphalt.

When the solar heat-reflective coating composition is to be deposited on or laminated onto the surface of tie-layer after the tie-layer has been deposited onto the hot bituminous surface during the manufacturing of roofing membrane, it is important to control the bituminous viscosity or the thickness of the tie-layer such that: the hot bituminous coating will not completely bleed through the tie-layer prior to the application of the heat reflective coating.

Preferably, the reinforcement material comprises a nonwoven web of fibers. Preferably, the nonwoven web comprises fibers selected from the group of glass fibers, polymeric fibers and combinations thereof. Examples of suitable reinforcement material for use as a tie-layer include, but not limited to, non-woven glass fiber mats, non-woven polyester mats, composite non-woven mats of various fibers, composite woven fabrics of various fibers, industrial fabrics such as papermaker's forming fabrics and papermaker's canvasses, polymer netting, screen, and mineral particles. The fibers employed in preparing the reinforcing material can be spun, blown or formed by other processes known in the art. Yarn for forming the reinforcement material can include mono-filament yarn, multi-filament yarn, spun yarn, processed yarn, textured yarn, bulked yarn, stretched yarn, crimped yarn, chenille yarn, and combinations thereof. The cross-section of the yarn employed can be circular, oval, rectangular, square, or star-shaped. The yarn can be solid, or hollow. The yarn can be formed from natural fibers such as wool and cotton; synthetic materials such as polyester, nylon, polypropylene, polyvinylidene fluoride, ethylene tetrafluroethylene copolymer, polyethylene terephthalate, polybutylene terephthalate, polytrimethylene terephthalate, poly(meth)acrylates, aramide, polyetherketone, polyethylene naphthalate, and the like, as well as non-organic materials such as spun glass fibers and metallic materials, or combinations thereof.

Non-woven glass fiber mats for use in the process of the present invention preferably have a weight per unit area of from about 40 to 150 $g/m^2$, more preferably form about 70 to 120 $g/m^2$, and still more preferably from about 80 to 100 $g/m^2$, and a thickness of from about 0.01 to 1 mm. Non-woven glass mats having a weight per unit area of about 90 $g/m^2$ (0.018 $lb/ft^2$) are typically employed.

Preferably, the tie-layer has sufficient thickness so that an adequately thick layer of solar heat-reflective coating composition can be adhered thereto to provide effective solar heat reflectance. Preferably, the tie layer has a thickness of from about 0.001 cm to about 0.1 cm, more preferably from about 0.001 cm to about 0.03 cm.

Examples of mineral particles that can be used as tie layer materials include conventional roofing granules. In the present invention, colored, infrared-reflective granules, such as disclosed in U.S. patent application Ser. No. 10/679,898, filed Oct. 6, 2003, can be mixed with conventional roofing granules. Alternatively, colored, infrared-reflective granules can be substituted for conventional roofing granules to enhance the solar-heat reflectance of the solar-reflective roofing membranes of the present invention. When mineral particles are employed as the reinforcement material, it is preferred that the mineral particles have an average particle size of from about 180 to about 850 µm. Mineral particles may function as a tie layer for holding the polymeric coating on the roofing sheet. For example, the tie layer coat may adhere better to the granules than to the bituminous base sheet and the mineral particles may adhere to both the bituminous base sheet and to the powder coating. In this sense the tie layer is not necessarily a reinforcement material in the sense of reinforcing the sheet, but rather the tie layer tends to enhance the holding power of the tie layer to the surface of the bituminous sheet.

Polymeric coating compositions are preferably employed in several embodiments of the present invention to form the solar heat-reflective upper layer, or a portion thereof. In particular, in one presently preferred embodiment, the upper layer is formed from a first polymeric coating composition including at least one first polymeric coating binder. In another presently preferred embodiment, the upper layer is formed from an inner sub-layer and an outer sub-layer. In this case, the outer sub-layer is preferably formed from a first polymeric coating composition including at least one first polymeric coating binder, and the inner sub-layer is formed from a second polymeric coating composition including at least one second polymeric coating binder. In another embodiment, the outer layer from a sheet or film preferably formed from a polymeric composition and the inner layer is formed from a polymeric coating composition including at least one polymeric binder.

The polymeric coating compositions employed in the present invention can be liquid polymeric compositions such as solutions in which a suitable polymeric binder is dissolved or dispersed in an organic solvent or carrier, or aqueous polymer compositions such as aqueous dispersions of a suitable polymeric binder. Alternatively, powder coating compositions, such as powder coating compositions including a suitable polymeric binder in solid form, can be employed. Whatever the physical form of the polymeric coating composition, the polymeric binder is preferably selected to provide good exterior durability to the roofing membranes of the present invention. Thus, polymeric binders with good uv resistance, such as poly(meth)acrylate ("acrylic"), and fluorinated polymer binders, are preferred.

Examples of polymeric materials that can be employed as polymeric binders in the polymeric coating compositions of the present invention include acrylic copolymers, polyesters, polyamides, epoxies, nonacid-containing polyolefins, polyolefin alloys, polypropylene, acid-containing polyolefins, polyvinyl chloride, polyester block amide, ethylene-chlorotrifluorethylene, and polyvinylidene fluoride.

Preferably, the monomer composition of the polymeric binder is selected to provide a glass transition temperature of the polymer from about 66 degrees C. to about 204 degrees C. (150 degrees F.-400 degrees F.). Alternatively, in the case of a crystalline or semicrystalline thermoplastic polymeric binder, the composition is selected to provide a melting temperature greater than about 90 degrees C., more preferably greater than about 110 degrees C., and preferably less than about 210 degrees C.

The polymeric coating compositions employed in the process of the present invention may also include pigments, such as solar heat-reflective pigments and coloring pigments, dyes, biocides, flow control agents, thickeners, coalescents to promote film formation, solvents (in the case of aqueous dispersions), agents to adjust surface tension, viscosity control agents, light stabilizers, antioxidants, and other components.

When the polymeric coating compositions of the present invention are in a fluid state, such as when they comprise an aqueous dispersion, an non-aqueous solution or dispersion, or a melt, a fluid coating application method can be used to apply such polymeric coating compositions in the process of the present invention. Examples of fluid coating application techniques that can be employed include curtain coating, gravure coating, dip coating, rod coating, knife coating, air-knife coating, blade coating, forward roll coating, reverse roll coating, slot coating, and extrusion coating. Factors affecting the choice of a method of a coating are discussed, e.g., in Cohen, E. et al. *Modern Coating and Drying Technology* (*Advances in Interfacial Engineering Series*), (Wiley-VCH 1992) pp. 10-18.

The powder coating materials optionally employed as polymeric coating compositions in the process of the present invention are typically dry, solid powder materials that include a polymeric resinous binder with a melting temperature above ambient temperature and optional pigments, extenders, flow control agents, plasticizers, reactive diluents, and/or other additives. Powder coating materials or compositions for use in the present invention preferably include both a polymeric binder and a solar-reflective pigment.

Suitable powder coating material should have excellent outdoor durability; a melting temperature for application of between 66 degrees C. to about 204 degrees C. (150 degrees F.-400 degrees F.); and low viscosity upon melting to completely impregnate the tie-layer in a relatively short period of time. By "low viscosity" is meant a viscosity of from about 50 centipoise to 3000 centipoise.

Examples of suitable powder coating compositions include thermoplastic and thermoset powder coating compositions. Thermoplastic powder coating compositions are frequently employed to provide coating of at least about 250 microns. Thermosetting powder coating compositions are frequently employed to provide thinner coatings, such as coatings with a thickness of from about 20 to 80 microns. Suitable powder coating polymeric materials include, but are not limited to, acrylic and related copolymers, polyesters, polyamides, epoxies, polyolefin and its alloys, polypropylene, acid containing polyolefins such as polyethylene acrylic acid or polyethylene methacrylic acid, polyvinyl chloride, polyester block amide, ethylene chlorotrifluorethylene, or polyvinylidene fluoride or other fluorinated polymers or copolymers. Examples of thermosetting materials include epoxy, polyester, and acrylic thermosetting materials. Examples of thermoplastic materials include polyamide, polyethylene, polypropylene, polyvinyl chloride, polyester, and polyvinylidene fluoride thermoplastic materials.

Preferably, a powder coating composition having good exterior durability and weatherability characteristics is employed. Examples of powder coating compositions providing coatings with good exterior durability include thermoplastic polyester compositions, thermoplastic polyvinylidene fluoride compositions, thermosetting polyester compositions such as hydroxyalkylamide polyesters, thermosetting epoxy resin compositions, thermosetting epoxy-polyester hybrid coating compositions, thermosetting polyester-triglycydyl isocyanurate compositions, thermosetting GMA acrylic compositions, thermosetting acrylic urethane compositions, and thermosetting polyester urethane compositions.

Powder coating compositions for use in the present invention are preferably pigmented with solar heat-reflective pigments or fillers in order to produce an upper surface coating of high solar reflectance. Examples of suitable heat-reflective pigments have been disclosed in the commonly assigned U.S. patent application Ser. No. 10/679,898, filed Oct. 6, 2003, incorporated herein by reference.

In addition, powder coating compositions for use in the preparative process of the present invention can include other components, such as curing agents or hardeners, extenders, and additives such as thixotropes, flow modifiers, and the like.

Examples of heat- or infrared-reflective pigments that can be employed include colored infrared-reflective pigments and white infrared-reflective pigments.

Upper surface coatings for use in preparing roofing membranes according to the present invention preferably include at least one infrared-reflective pigment. The at least one infrared-reflective pigment can be a colored infrared-reflective pigment, a white infrared-reflective pigment, or a mixture of two or more infrared-reflective pigments.

Preferably, the at least one colored infrared-reflective pigment is selected from the group consisting of (1) infrared-reflective pigments comprising a solid solution including iron oxide and (2) near infrared-reflecting composite pigments.

Preferably, in the upper surface coating composition, when a colored infrared-reflective pigment is employed, the colored infrared-reflective pigment comprises from about 2 percent by weight to about 40 percent by weight of the coating composition. More preferably, the colored infrared-reflective pigment comprises about 5 percent by weight to about 35 percent by weight of the coating composition.

Preferably, in the upper surface coating composition, when a white infrared pigment, such as titanium dioxide, is employed, the white infrared-reflective pigment comprises from about 2 percent by weight to about 40 percent by weight of the coating composition. More preferably, the white infrared-reflective pigment comprises about 10 percent by weight to about 35 percent by weight of the coating composition. Still more preferably, the white infrared-reflective pigment comprises from about 25 percent by weight to about 35 percent by weight of the coating composition.

Preferably, in the upper surface coating composition, when a combination of a white infrared-reflective pigment, such as titanium dioxide, and a colored infrared-reflective pigment, is employed, the combination of the white infrared-reflective pigment and the colored infrared-reflective pigment comprises from about 2 percent by weight to about 40 percent by weight of the coating composition. Preferably, the colored infrared-reflective pigment comprises from about 2 percent by weight to about 10 percent by weight of the coating composition, and the white infrared-reflective pigment comprises from about 25 percent by weight to about 35 percent by weight of the coating composition.

Preferably, the upper surface coating composition further comprises at least one infrared-reflective functional pigment selected from the group consisting of light-interference platelet pigments including mica, light-interference platelet pigments including titanium dioxide, mirrorized silica pigments based upon metal-doped silica, and alumina.

When alumina is employed as the at least one infrared-reflective pigment, the alumina (aluminum oxide) preferably has a particle size less than #40 mesh (425 microns), preferably between 0.1 micron and 5 microns, and more preferably between 0.3 micron and 2 microns. It is preferred that the alumina includes greater than 90 percent by weight $Al_2O_3$, and more preferably, greater than 95% by weight $Al_2O_3$.

Optionally, the upper surface coating composition can include at least one coloring material selected from the group consisting of granule coloring pigments and UV-stabilized dyes.

Preferably, the at least one colored, infrared-reflective pigment comprises a solid solution including iron oxide, such as disclosed in U.S. Pat. No. 6,174,360, incorporated herein by reference. The colored infrared-reflective pigment can also comprise a near infrared-reflecting composite pigment such as disclosed in U.S. Pat. No. 6,521,038, incorporated herein by reference. Composite pigments are composed of a near-infrared non-absorbing colorant of a chromatic or black color and a white pigment coated with the near infrared-absorbing colorant. Near-infrared non-absorbing colorants that can be used in the present invention are organic pigments such as organic pigments including azo, anthraquinone, phthalocyanine, perinone/perylene, indigo/thioindigo, dioxazine, quinacridone, isoindolinone, isoindoline, diketopyrrolopyrrole, azomethine, and azomethine-azo functional groups. Preferred black organic pigments include organic pigments having azo, azomethine, and perylene functional groups.

Examples of near infrared-reflective pigments available from the Shepherd Color Company, Cincinnati, Ohio, include Arctic Black 10C909 (chromium green-black), Black 411 (chromium iron oxide), Brown 12 (zinc iron chromite), Brown 8 (iron titanium brown spinel), and Yellow 193 (chrome antimony titanium).

Light-interference platelet pigments are known to give rise to various optical effects when incorporated in coatings, including opalescence or pearlescence. Surprisingly, light-interference platelet pigments have been found to provide or enhance infrared-reflectance of roofing granules coated with compositions including such pigments.

Examples of light-interference platelet pigments that can be employed in the process of the present invention include pigments available from Wenzhou Pearlescent Pigments Co., Ltd., No. 9 Small East District, Wenzhou Economical and Technical Development Zone, Peoples Republic of China, such as Taizhu TZ5013 (mica, rutile titanium dioxide and iron oxide, golden color), TZ5012 (mica, rutile titanium dioxide and iron oxide, golden color), TZ4013 (mica and iron oxide, wine red color), TZ4012 (mica and iron oxide, red brown color), TZ4011 (mica and iron oxide, bronze color), TZ2015 (mica and rutile titanium dioxide, interference green color), TZ2014 (mica and rutile titanium dioxide, interference blue color), TZ2013 (mica and rutile titanium dioxide, interference violet color), TZ2012 (mica and rutile titanium dioxide, interference red color), TZ2011 (mica and rutile titanium dioxide, interference golden color), TZ1222 (mica and rutile titanium dioxide, silver white color), TZ1004 (mica and anatase titanium dioxide, silver white color), TZ4001/600 (mica and iron oxide, bronze appearance), TZ5003/600 (mica, titanium oxide and iron oxide, gold appearance), TZ1001/80 (mica and titanium dioxide, off-white appearance), TZ2001/600 (mica, titanium dioxide, tin oxide, off-white/gold appearance), TZ2004/600 (mica, titanium dioxide, tin oxide, off-white/blue appearance), TZ2005/600 (mica, titanium dioxide, tin oxide, off-white/green appearance), and TZ4002/600 (mica and iron oxide, bronze appearance).

Examples of light-interference platelet pigments that can be employed in the process of the present invention also include pigments available from Merck KGaA, Darmstadt, Germany, such as Iriodin® pearlescent pigment based on mica covered with a thin layer of titanium dioxide and/or iron oxide; Xirallic™ high chroma crystal effect pigment based upon $Al_2O_3$ platelets coated with metal oxides, including Xirallic T 60-10 WNT crystal silver, Xirallic T 60-20 WNT sunbeam gold, and Xirallic F 60-50 WNT fireside copper; Color Stream™ multi color effect pigments based on $SiO_2$ platelets coated with metal oxides, including Color Stream F 20-00 WNT autumn mystery and Color Stream F 20-07 WNT viola fantasy; and ultra interference pigments based on $TiO_2$ and mica.

Examples of mirrorized silica pigments that can be employed in the process of the present invention include pigments such as Chrom Brite™ CB4500, available from Bead Brite, 400 Oser Ave, Suite 600, Hauppauge, N.Y. 11788.

Upper surface coatings can include at least one infrared-reflective white pigment. Examples of white pigments that can be employed in the process of the present invention include rutile titanium dioxide, anatase titanium dioxide, lithopone, zinc sulfide, zinc oxide, lead oxide, and void pigments such as spherical styrene/acrylic beads (Ropaque® beads, Rohm and Haas Company), and hollow glass beads having pigmentary size for increased light scattering. Preferably, the at least one reflective white pigment is selected from the group consisting of titanium dioxide, zinc oxide and zinc sulfide.

It is preferred that the at least one reflective white pigment comprises from about 10 percent by weight to about 40 percent by weight of the upper surface coating composition. It is more preferred that the at least one reflective white pigment comprises from about 20 percent by weight to about 30 percent by weight of the upper surface coating composition.

The polymeric coating compositions of the present invention are prepared by admixing the solar heat-reflective pigment(s) with the polymeric resinous binder and other optional additives and then subsequently extruding and milling the mixture. Alternatively, the polymeric coating compositions of the present invention can be prepared by blending the solar heat-reflective pigment(s) with the polymeric resinous binder after the binder and other optional additives have been mixed, extruded and milled. In the alternative, powder coating compositions in accordance with the present invention can be prepared by blending the solar heat-reflective pigment(s) with a polymeric resinous binder after the powder and other optional additives have been mixed, extruded and milled, and subsequently subjecting the blend to compressive forces to bond the solar heat-reflective-pigment(s) to the surface of the milled particles of the polymeric resinous binder.

Preferably, the infrared-reflective upper surface coating is provided in a thickness effective to render the coating opaque to infrared radiation, such as a coating thickness of at least about 75 microns. However, advantageous properties of the present invention can be realized with significantly lower coating thicknesses, such as at a coating thickness of from about 2 microns to about 25 microns, including at a coating thickness of about 5 microns.

Optionally, the upper surface coating composition includes at least one extender pigment such as barium sulfate, wollastanite, talc, calcium carbonate, or clay.

In a presently preferred process of the present invention, a roofing membrane of the present invention is produced by first laminating a tie-layer onto a hot asphaltic surface of a membrane substrate to adhere the tie-layer.

In the case of a fibrous web tie-layer, the lamination to the asphaltic surface serves to partially impregnate the tie-layer with material from the substrate layer. It is preferred that the tie-layer is well adhered to the substrate membrane and the asphalt coating does not over-saturate the tie-layer in order that the upper layer can be properly adhered to the tie-layer.

In another presently preferred process of the present invention, a roofing membrane of the present invention is produced by first forming a tie-layer comprised of particulate material on a hot asphaltic surface of a membrane substrate to adhere the tie-layer. The particulate material, such as roofing granules, is deposited on the hot asphaltic surface such that the particulate material at least partially penetrates into and at least partially protrudes from the asphaltic surface such that a secure mechanical bond is formed when the heated surface cools. It is preferred that the particles of the tie-layer be well adhered to the substrate membrane and the asphalt coating are not too far embedded in the asphaltic surface in order that the upper layer can be properly adhered to the tie-layer.

Subsequently, a suitable amount of powder coating material is deposited onto the upper surface of the tie-layer, followed by heating to melt or fuse the powder coat in place. This can be accomplished by direct infrared heat lamps, localized microwave irradiation, direct application of hot air by passage through a convection oven or the like, impingement heating, or by heated hot press rolls, or a combination thereof.

In general, the method of application depends upon the chemical and physical characteristics of the polymeric powder coating composition. In the case of thermosetting polymer systems, fine-particle sized powder can be applied to the tie-coat surface by suitable spray equipment or by gravity deposition from a suitable reservoir or hopper. In the case of thermoplastic materials, fluidized bed application of the web can be used, although in general it is preferred to coat only one side of the bituminous membrane with the powder coating material.

Conventional powder coating application equipment can be used to apply the polymeric powder, such as electrostatic spray equipment employing corona charging or triboelectric charging of the powder coating particles. Alternatively, an air spray system that delivers the powder onto a substrate having sufficient heat to soften the polymeric powder for sticking to the surface can be used. Preferably, the application equipment includes provisions for precision application of the powder coating composition to the tie layer, and collection and recycling of excess powder coating composition in order to increase the efficiency and lower the cost of the process. When electrostatic spray equipment is employed to deliver the polymeric powder composition to the tie layer, it is preferred that a suitable electrical charge be provided on the tie layer or that the tie layer be electrically grounded so as to increase electrostatic attraction between the tie layer and the polymeric powder composition. For example, the tie layer can be formed from a non-woven material that includes electrically conductive fibers.

Preferably, the powder coating is applied to the intermediate web or substrate in sufficient quantity so as to completely cover the surface, while forming a thin coating film after the powder coating is fused. Preferably, the powder coating material is applied to the intermediate substrate in sufficient quantity to provide a coating of from about 25 to about 300 microns in thickness, more preferably from about 50 to about 200 microns, with a thickness of from about 75 to about 175 microns being especially preferred.

The method of fusing and/or curing the powder coating composition depends on the chemical and physical properties of the polymeric powder, including the average particle size of the powder and particle size distribution, and the chemical properties of the crosslinking agent, if any, present in the material. If the powder coating composition includes a suitable heat-activated crosslinking agent, infrared heat can be used. Similarly, if the powder coating composition includes a UV-activated crosslinking agent, ultraviolet radiation can be used to cure the powder coating composition. In some other instances, a higher energy actinic radiation source such as an electron beam or gamma source can be used to impart cure to the powder coating composition.

In one presently preferred embodiment of the present invention, a tie-layer is pre-coated with a solar heat-reflective coating composition through a process such as extrusion coating, lamination, spray, curtain or roller coating, and the coating composition is then cured to form an intermediate web. The resulting intermediate web includes an inner sub-layer formed by the tie-layer and an outer sub-layer formed by the cured solar heat-reflective coating composition, although the inner sub-layer and outer sub-layer can interpenetrate. Preferably, the solar heat reflective coating composition is cured prior to complete penetration of the coating throughout the tie-layer. It is desirable that the coating composition does not completely encapsulate the tie-layer, so that the lower, exterior surface of the tie-layer can adhere properly to the asphalt substrate. Partial bleeding through of the tie layer by the heat reflective coating is acceptable, provided that sufficient adhesion between the intermediate web and the base sheet layers can be achieved. Other methods of coating the tie layer on one side known in the art can be employed to form the intermediate web. Examples of suitable coating materials include thermoplastics. thermoplastic elastomers and their mixtures, UV curable coatings, powder coatings, latex coatings and inorganic coatings.

A protective overcoat or top coat can also be applied over the solar heat-reflective coating composition. The solar heat-reflective upper layer in this case thus comprises a top coat or overcoat applied to the solar heat-reflective coating. For example, in order to help protect the cured or fused solar heat-reflective coating composition from environmental degradation, an overcoat of a suitable coating material can be applied to the fused or cured solar heat-reflective coating composition. Examples of protective overcoat compositions include fluoropolymer coatings, acrylic modified fluoropolymer emulsions, all-acrylic coating materials, and in particular solvent-based and water-based acrylic coating materials with good adhesion to the powder coating composition employed. The overcoat composition includes a suitable binder, and optional pigment, such as a suitable infrared-reflective pigment.

The upper layer can include a very durable layer of top coating and a second layer of solar heat-reflective coating, preferably in the form of a powder coating composition with good workability to penetrate and fill the tie layer, under the top layer. The upper layer itself can be formed from a powder coating composition having suitable material properties. Such a multi-layer construction has the advantage of permitting the top layer composition to provide exceptional outdoor durability for roof longevity and other functionalities, while opening wider material choices for the solar heat reflective under-layer. For example, when a durable material is employed for the top layer, a less weatherable powder coating having better melt-flowing properties at lower processing temperatures than would otherwise be achievable can be employed for the under-layer. Thus, the top coating composition is preferably formulated to provide good exterior durability. The top coating composition can also provided additional functionalities such as anti-microbial effects, slip resistance, better fire resistance, or self-cleaning effects. Examples of suitable materials for use as the top coating include fluoropolymers such as PVDF (Kynar Aquatec and Ultraflex from Arkema) UV-curable coatings, acrylic latex based coatings, or silicone emulsions. The top layer can be applied to the surface of under-layer through methods such as curtain coating, spraying, extrusion coating, or roller coating. The under-layer is preferably formed from a coating composition including solar heat-reflective pigments or fillers, and a binder having a melt temperatures from about 93 degrees C. to about 121 degrees C. (about 200 degrees F. to about 250 degrees F.), and such that the under-layer composition becomes tack-free for temperatures below about 66 degrees C. (about 150 degrees F.).

The present invention also provides an improved roof having high solar heat resistance. The roof comprises a roofing deck, and a roofing membrane with high solar heat resistance, according to the present invention, adhered to the roofing deck. Conventional roofing decks, such as decks formed from plywood, steel, cement, et al. can be covered with a roofing membrane according to the present invention. In addition, the present invention provides a method of constructing a roof having high solar heat resistance. The roof construction method comprises adhering to a roofing deck a roofing membrane with high solar heat resistance according to the present invention.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

Example 1

A 12.7 cm by 12.7 cm (5 inch×5 inch) piece of an asphalt-based, self-adhering roofing base sheet (WinterGuard, commercially available from CertainTeed Corporation, Valley Forge, Pa.) is first heated to about 50 degree C. and then a non-woven glass fiber mat (1.8 lb. mat available from Johns Manville Corp.) is laminated onto the self-adhering side of the base sheet using a 12.3 kg (27 lb.) roller. A white powder coat mixture consisting of 6.05 g clear acrylic powder (Ultra Detail from Mark Enterprises, Anaheim, Calif.) and 2.66 g of $TiO_2$ white pigment (TiPure R-102 from DuPont Corp.) is then deposited onto the surface of the glass fiber mat using a perforated hand shaker until the surface is covered with a uniform layer of the power coat. The resultant sheet is then heated under infrared heat lamps to a surface temperature of 116-121 degrees C. (240-250 degrees F.) until the powder coat is completely melted and the tie-layer filled to form a uniform white coating. The resultant sample of roofing membrane has an averaged solar reflectance of 76.5% as measured by the ASTM C-1 549 method.

Example 2

A 12.7 cm by 12.7 cm (5 inch×5 inch) of an asphalt-based, self-adhering roofing base sheet (WinterGuard, commercially available from CertainTeed) is first heated to about 50° C. and then a non-woven glass fiber mat (1.81 lb. mat available from Johns Manville Corp.) is laminated onto the self-adhering side of the base sheet using a 12.3 kg (27 lb.) roller. A white powder coat of nylon 11 with melting temperature of about 186 degrees C. (Rilsan 11 polyamide from Atofina Chemicals, Inc., Philadelphia, Pa.) is then deposited onto the surface of the glass mat using a perforated hand shaker until the surface is covered by a uniform layer of the powder coat. The resultant sheet is then pressed under a hot plate with the top plate set at 193 degrees C. (380 degrees F.) and bottom plate set at room temperature using pressing load of 3630 kg (8000 lb.), holding time of 15 seconds, and a gauge bar of 0.24 cm (3/16 inch) to prevent over-press. The resultant sample of roofing membrane has a very smooth surface finish and an averaged solar reflectance of 77.6%.

Example 3

Roofing membranes having inert mineral particles derived from crushed slate rocks as tie layer (particle sizes ranging from US mesh #20 to #70, available from CertainTeed Corp., Glenwood, Ariz.) were coated with acrylic latex containing 25 wt % $TiO_2$ as solar heat reflective material. The coatings were applied by air-assisted spraying nozzles (Kinetix Airspray LP spray gun with 0.090" nozzle tip, available from Nordson Corp., Amherst, Ohio), electrostatic spray (ES) with rotary atomizer (RA-20 Rotary Atomizer available also from Nordson Corp), and the combination of both. The spray applications were carried out at conveyor speed of 50 feet per minute. Table 1 lists the spraying conditions and the results of their color and solar reflectance measurements. In Run #6, a primer of acrylic based water emulsion was first sprayed on the membranes, followed by a topcoat of same acrylic latex. The coatings were then cured to form the reflective membrane. These examples show that coated membranes have significantly high solar reflectance and excellent adhesion to the asphalt substrate by the tie layer, as indicated by no peeling/cracking after 3000 hours in the xenon-arc weatherometer according to ASTM G-155 test methods.

TABLE 1

| Run No. | Sprayer Type | Color Reading | | | % Solar Reflectance |
|---|---|---|---|---|---|
| | | L* | a* | b* | |
| 1 | Control - no coating | 26.95 | 0.29 | 3.03 | 6.5 |
| 2 | Electrostatic spray (ES) with 3 rotary atomizer | 94.57 | −1.07 | 0.34 | 71.4 |
| 3 | 2 spray guns and ES with 2 rotary atomizers | 93.1 | −1.11 | 0.03 | 68.9 |
| 4 | 3 spray guns | 92.32 | −1.22 | −0.36 | 68.5 |
| 5 | 1 spray gun and ES with 2 rotary atomizers | 94.11 | −1.09 | 0.35 | 71.9 |
| 6 | Primer: ES with 3 rotary atomizer Topcoat: ES with 2 rotary atomizer | 97.71 | −0.97 | 0.66 | 81.2 |

Example 4

Roofing membranes having inert mineral particles derived from crushed rhyolite rocks as tie layer (particles ranging from US mesh #10 to #40, Flintglas® Mineral Surfaced Cap Sheet, available from CertainTeed Corp., Piedmont, Mo.) were coated with acrylic latex containing 21.4 weight percent titanium dioxide as solar heat reflective material. The coating was applied by a curtain coater at a curtain height of 8 inches (Koch Model #80 curtain coater, Koch Manufacturing LLC, Evansville, Ind.) and conveyor speed of 120 feet per minute. The coating was applied at a wet film thickness of 17 mils. The coated membranes were then cured in a forced-air oven at 180 degrees F. (82 degrees C.) with an oven dwell time of one minute. The coated membrane had a color reading of L*=91.93, a*=−0.99, b*=0.87 as measured by HunterLab Labscan XE calorimeter and an averaged solar reflectance of 73.1 percent as measured by the ASTM C1145 method. In comparison, a control sample with no coating had a color reading of L*=62.24, a*=−0.45, b*=0.88, and a solar reflectance of 26 percent. The coated membrane passes 2000 hours in xenon-arc weatherometer without peeling, crack, or coating failure, which shows that the coarser tie layer also help in promoting the adhesion between the coating and the asphalt substrate.

Various modifications can be made in the details of the various embodiments of the processes, compositions and articles of the present invention, all within the scope and spirit of the invention and defined by the appended claims.

We claim:

1. A roofing membrane with high solar heat reflectance, the roofing membrane comprising:
   a bituminous base sheet comprising a continuous substrate sheet of fibrous material, the continuous substrate sheet being saturated with a bituminous material and coated on at least one side with a bituminous material;
   a tie-layer comprising a reinforcement material on the bituminous base sheet;
   the reinforcement material comprising mineral particles; and
   a solar heat-reflective upper layer on the tie-layer.

2. A roofing membrane according to claim 1 wherein the tie-layer and the solar heat-reflective upper layer interpenetrate.

3. A roofing membrane according to claim 1 wherein the solar heat-reflective upper layer comprises a first polymeric coating comprising at least one first polymeric binder and at least one solar heat-reflective pigment.

4. A roofing membrane according to claim 3 wherein the first polymeric binder is selected from the group consisting of acrylic copolymers, polyesters, polyamides, epoxies, non-acid-containing polyolefins, polyolefin alloys, polypropylene, acid-containing polyolefins, polyvinyl chloride, polyester block amide, fluorinated polymers, fluorinated copolymers, ethylene-chlorotrifluorethylene, and polyvinylidene fluoride.

5. A roofing membrane according to claim 1 wherein the solar-heat reflective upper layer comprises an inner sub-layer and an outer sub-layer.

6. A roofing membrane according to claim 5 wherein the outer sub-layer comprises at least one first polymeric binder, the inner sub-layer comprising a second polymeric coating adapted to interpenetrate the tie layer.

7. A roofing membrane according to claim 6 wherein the second polymeric coating comprises at least one second polymeric binder and at least one solar heat-reflective pigment.

8. A roofing membrane according to claim 7 wherein the second polymeric binder is selected from the group consisting of acrylic copolymers, polyesters, polyamides, epoxies, nonacid-containing polyolefins, polyolefin alloys, polypropylene, acid-containing polyolefins, polyvinyl chloride, polyester block amide, ethylene-chlorotrifluorethylene, and polyvinylidene fluoride.

9. A roofing membrane according to claim 6 wherein the second polymeric binder is an acrylic copolymer.

10. A roofing membrane according to claim 5 wherein the outer sub-layer comprises a durable material.

11. A roofing membrane according to claim 10 wherein the outer sub-layer comprises a material selected from polyvinylidene fluoride, UV-curable coating compositions, acrylic copolymer compositions, fluorinated copolymer compositions, and silicone emulsions.

12. A roofing membrane according to claim 1 wherein the solar heat-reflective layer comprises titanium dioxide.

13. A roof having high solar heat reflectance, the roof comprising:
   a roofing deck;
   a roofing membrane with high solar heat reflectance adhered to the roofing deck,
   the roofing membrane comprising:
   a bituminous base sheet comprising a continuous substrate sheet of fibrous material, the continuous substrate sheet being saturated with a bituminous material and coated on at least one side with a bituminous material;
   a tie-layer comprising a reinforcement material on the bituminous base sheet;
   the reinforcement material comprising mineral particles;
   a solar heat-reflective upper layer on the tie-layer; and
   a protective top coating on the upper layer.

14. A roofing membrane with high solar heat reflectance, the roofing membrane comprising:
   a bituminous base sheet comprising a continuous substrate sheet of fibrous material, the continuous substrate sheet being saturated with a bituminous material and coated on at least one side with a bituminous material;
   a tie-layer comprising a reinforcement material comprising a non-woven web of fibers on the bituminous base sheet; and
   a solar heat-reflective upper layer on the tie-layer.

15. A roofing membrane according to claim 14 wherein the reinforcement material is selected from the group consisting of non-woven glass fiber mats, non-woven polyester mats, and composite non-woven mats.

16. A roofing membrane according to claim 15 wherein the reinforcement material comprises an industrial fabric selected from the group consisting of papermaker's forming fabrics and papermaker's canvasses.

17. A roofing material according to claim 1 wherein the reinforcement material is formed from yarn, the yarn being selected from the group consisting of mono-filament yarn, multi-filament yarn, spun yarn, processed yarn, textured yarn, bulked yarn, stretched yarn, crimped yarn, and chenille yarn.

18. A roofing material according to claim 1 wherein the reinforcement material is formed from yarn, the yarn being formed from a material selected from the group consisting of wool, cotton, polyester, nylon, polypropylene, polyvinylidene fluoride, ethylene tetrafluroethylene copolymer, polyethylene terephthalate, polybutylene terephthalate, polytrimethylene terephthalate, poly(meth)acrylates, aramide, polyetherketone, polyethylene naphthalate, spun glass fibers, and metallic materials.

19. A roofing membrane according to claim 15 wherein the reinforcement material comprises a non-woven glass fiber mat, the mat having a weight per unit area of from about 40 to 150 g/m$^2$.

20. A roofing membrane according to claim 19 wherein the mat has a weight per unit area of from about 70 to 120 g/m$^2$.

21. A roofing membrane according to claim 19 wherein the mat has a weight per unit area of from about 80 to 100 g/m$^2$.

22. A roofing membrane according to claim 15 wherein the reinforcement material comprises a non-woven glass fiber mat, the mat having a thickness of from about 0.01 to 1 mm.

23. A roofing membrane according to claim 1 wherein the mineral particles have an average particle size from about 180 to 850 micrometers.

24. A roofing membrane according to claim 13 wherein the mineral particles have an average particle size from about 180 to 850 micrometers.

* * * * *